(12) United States Patent
Meng et al.

(10) Patent No.: US 9,706,116 B2
(45) Date of Patent: Jul. 11, 2017

(54) PLENOPTIC COLOR IMAGING SYSTEM WITH ENHANCED RESOLUTION

(71) Applicants: Lingfei Meng, Redwood City, CA (US); Kathrin Berkner, Los Altos, CA (US)

(72) Inventors: Lingfei Meng, Redwood City, CA (US); Kathrin Berkner, Los Altos, CA (US)

(73) Assignee: Ricoh Co., LTD., Tokyo (JP)

( * ) Notice: Subject to any disclaimer, the term of this patent is extended or adjusted under 35 U.S.C. 154(b) by 0 days.

(21) Appl. No.: 14/069,242

(22) Filed: Oct. 31, 2013

(65) Prior Publication Data
US 2015/0116526 A1   Apr. 30, 2015

(51) Int. Cl.
| H04N 5/232 | (2006.01) |
| H04N 13/02 | (2006.01) |
| H04N 9/097 | (2006.01) |
| H04N 5/225 | (2006.01) |
| H04N 9/04 | (2006.01) |
| G06T 5/50 | (2006.01) |
| G06T 3/40 | (2006.01) |

(52) U.S. Cl.
CPC ....... *H04N 5/23232* (2013.01); *G06T 3/4053* (2013.01); *G06T 5/50* (2013.01); *H04N 5/2254* (2013.01); *H04N 5/2258* (2013.01); *H04N 9/045* (2013.01); *H04N 9/097* (2013.01); *H04N 13/0282* (2013.01); *G06T 2207/10052* (2013.01)

(58) Field of Classification Search
CPC .. H04N 5/232; H04N 5/23232; H04N 5/2258; H04N 13/0282; G06T 2207/10052; G06T 2200/21
USPC ............................................. 348/218.1, 340
See application file for complete search history.

(56) References Cited

U.S. PATENT DOCUMENTS

| 2002/0030755 | A1* | 3/2002 | Uchino | 348/342 |
| 2004/0119869 | A1* | 6/2004 | Tretter | H04N 5/23245 348/335 |
| 2006/0119710 | A1* | 6/2006 | Ben-Ezra et al. | 348/208.99 |
| 2007/0081086 | A1* | 4/2007 | Ingram | 348/262 |
| 2008/0030611 | A1* | 2/2008 | Jenkins | H04N 9/045 348/336 |
| 2008/0309813 | A1* | 12/2008 | Watanabe | G02B 27/46 348/340 |
| 2010/0201831 | A1* | 8/2010 | Weinstein | H04N 9/045 348/221.1 |
| 2011/0073752 | A1* | 3/2011 | Berkner et al. | 250/227.2 |

(Continued)

FOREIGN PATENT DOCUMENTS

WO   WO 2009/150061 A1   12/2009

OTHER PUBLICATIONS

Wang, Z. et al., "A Comparative Analysis of Image Fusion Methods," IEEE Transactions on Geoscience and Remote Sensing, Jun. 2005, pp. 1391-1402, vol. 43, No. 6.

(Continued)

*Primary Examiner* — Abdelaaziz Tissire
(74) *Attorney, Agent, or Firm* — Fenwick & West LLP

(57) ABSTRACT

Color plenoptic images captured by a spectrally-coded plenoptic imaging system are combined with higher resolution higher resolution images captured by a conventional imaging system, resulting in color images with higher resolution than those captured by the plenoptic imaging system alone.

14 Claims, 9 Drawing Sheets
(2 of 9 Drawing Sheet(s) Filed in Color)

(56) References Cited

U.S. PATENT DOCUMENTS

| | | | |
|---|---|---|---|
| 2011/0080491 A1* | 4/2011 | Drazic | G02B 27/0075 |
| | | | 348/222.1 |
| 2011/0200319 A1* | 8/2011 | Kravitz et al. | 396/333 |
| 2012/0044328 A1 | 2/2012 | Gere | |
| 2012/0182438 A1* | 7/2012 | Berkner | G01J 3/36 |
| | | | 348/222.1 |
| 2012/0257070 A1* | 10/2012 | Grossetete et al. | 348/218.1 |
| 2014/0063332 A1* | 3/2014 | Miyawaki | H04N 5/2254 |
| | | | 348/360 |
| 2014/0206979 A1 | 7/2014 | Berkner | |

OTHER PUBLICATIONS

Lu, C-H. et al., "High-Resolution Light-Field Microscopy," Imaging and Applied Optics, Optical Society of America, 2013, 3 pages.

Núñez, J. et al., "Multiresolution-Based Image Fusion with Additive Wavelet Decomposition," IEEE Transactions on Geoscience and Remote Sensing, May 1999, pp. 1204-1211, vol. 37, No. 3.

González-Audícana, M. et al., "Fusion of Multispectral and Panchromatic Images Using Improved IHS and PCA Mergers Based on Wavelet Decomposition," IEEE Transactions on Geoscience and Remote Sensing, Jun. 2004, pp. 1291-1299, vol. 42, No. 6.

* cited by examiner

PLENOPTIC COLOR IMAGING SYSTEM WITH ENHANCED RESOLUTION

BACKGROUND OF THE INVENTION

1. Field of the Invention

This invention relates generally to plenoptic imaging systems.

2. Description of the Related Art

A plenoptic camera can collect multiples images of a light field simultaneously. If different color filters are inserted into a pupil plane of the main lens, then a plenoptic camera can capture multiple color images simultaneously. However, the resolution of a plenoptic system is reduced due to the fact that the resolution of the reconstructed images is determined by the number of lenslets in the microlens array. Different interpolation methods can be used to enhance the resolution, but some artifacts, such as aliasing, blurring, and edge halos, are often observed.

Thus, there is a need for improved approaches to increase the resolution of color images captured by a plenoptic camera.

SUMMARY

The present invention overcomes the limitations of the prior art by combining color plenoptic images captured by a spectrally-coded plenoptic imaging system with higher resolution images captured by a conventional imaging system, resulting in color images with higher resolution than those captured by the plenoptic imaging system alone.

The spectrally-coded plenoptic imaging system and higher resolution imaging system can be combined in different ways. In one approach, a dual-mode system combining the two, uses separate cameras. For example, a complete spectrally-coded plenoptic camera and a separate, complete grayscale camera may have their fields of view optically aligned through use of a beamsplitter. In this way, the spectrally-coded plenoptic camera captures a color plenoptic image of an object, and the grayscale camera captures a high resolution grayscale image of the same object. In another approach, the plenoptic imaging system and higher resolution imaging system share imaging optics, but have separate sensor arrays. The light from the shared imaging optics may be split, for example, by a beamsplitting device or a time-multiplexing device (such as a rotating chopper) and directed to the separate sensor arrays. In yet another approach, the plenoptic imaging system and higher resolution imaging system may share imaging optics and sensor arrays, with the system reconfigured alternately to operate as the spectrally-coded plenoptic imaging system and as the higher resolution imaging system.

Other aspects of the invention include methods, devices, components, systems, applications and other improvements and implementations related to the above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1A:
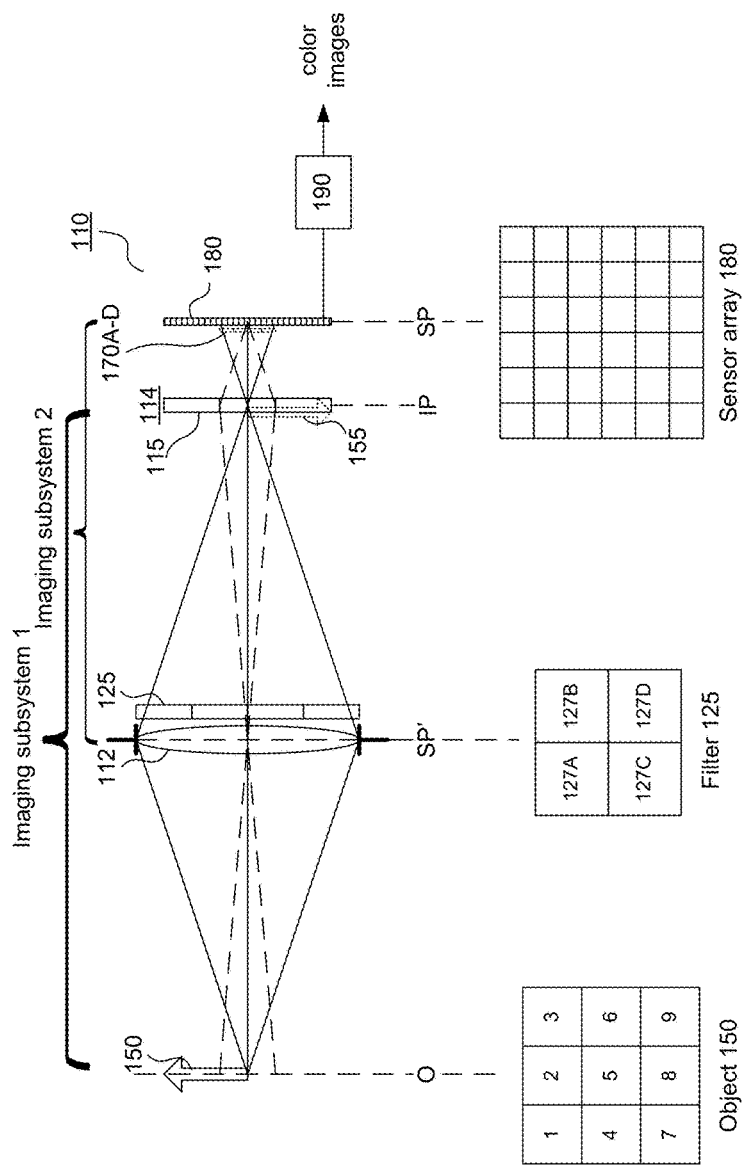
FIGS. 1A-1B are diagrams illustrating a spectrally-coded plenoptic imaging system.
Figure 1B:
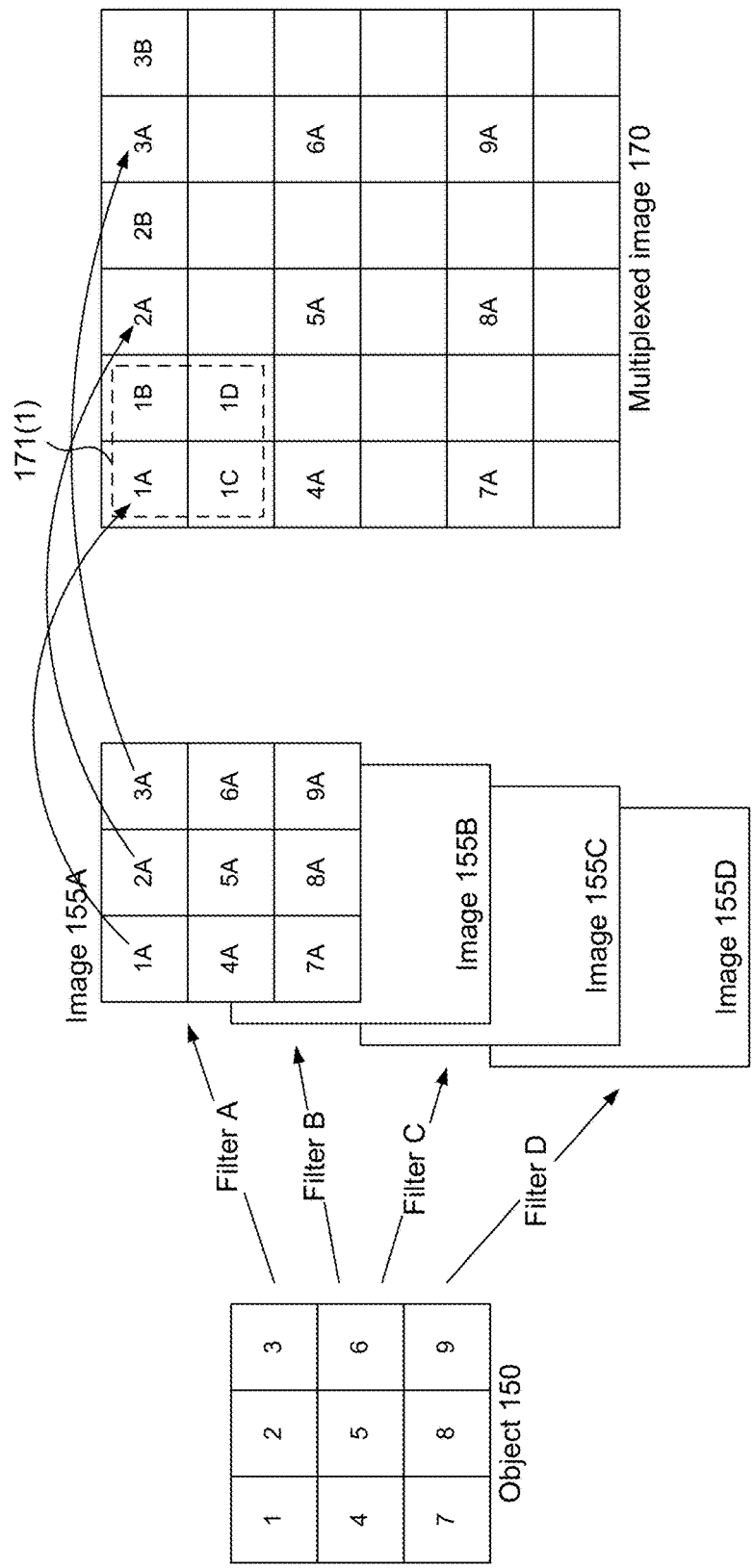

FIGS. 1A-1B are diagrams illustrating an example of a spectrally-coded plenoptic imaging system. The spectrally-coded plenoptic imaging system 110 includes primary imaging optics 112 (represented by a single lens in FIG. 1A), a secondary imaging array 114 (an array of image forming elements 115) and a sensor array 180. The secondary imaging array 114 may be referred to as a microimaging array. The secondary imaging array 114 and sensor array 180 together may be referred to as a plenoptic sensor module. These components form two overlapping imaging subsystems, shown as subsystem 1 and subsystem 1 in FIG. 1A.

For convenience, the imaging optics 112 is depicted in FIG. 1A as a single objective lens, but it should be understood that it could contain multiple elements. The objective lens 112 forms an optical image 155 of the object 150 at an image plane IP. The microimaging array 114 is located at the image plane IP. The system in its entirety forms spatially multiplexed and interleaved optical images 170 at the sensor plane SP. Examples of microimaging arrays 114 include microlens arrays, arrays of pinholes, micromirror arrays, checkerboard grids and waveguide/channel arrays. The microimaging array 114 can be a rectangular array, hexagonal array or other types of arrays. The sensor array 180 is also shown in FIG. 1A.

A color filter module 125 is positioned at a plane SP' conjugate to the sensor plane SP. The actual physical location may be before, after or in the middle of the imaging optics 112. The color filter module contains a number of spatially multiplexed filters 127A-D. In this example, the color filter module 125 includes a rectangular array of filters 127, as shown in the bottom portion of FIG. 1A.

The bottom portion of FIG. 1A provides more detail. In this diagram, the object 150 is divided into a 3×3 array of regions, which are labeled 1-9. The color filter module 125 is a 2×2 rectangular array of individual filters 127A-D. For example, each filter 127A-D may have a different spectral response. The sensor array 180 is shown as a 6×6 rectangular array.

FIG. 1B illustrates conceptually how the spatially multiplexed optical images 170A-D are produced and interleaved at sensor array 180. The object 150, if captured and filtered by filter 127A, would produce an optical image 155A. To distinguish filtered optical image 155A from an unfiltered image of the object, the 3×3 regions are labeled with the suffix A: 1A-9A. Similarly, the object 150 filtered by filters 127B,C,D, would produce corresponding optical images 155B,C,D with 3×3 regions labeled 1B-9B, 1C-9C and 1D-9D. Each of these four optical images 155A-D is filtered by a different filter 127A-D within filter module 125 but they are all produced simultaneously by the plenoptic imaging system 110.

The four optical images 155A-D are formed in an interleaved fashion at the sensor plane, as shown in FIG. 1B. Using image 155A as an example, the 3×3 regions 1A-9A from optical image 155A are not contiguous in a 3×3 block within optical image 170. Rather, regions 1A, 1B, 1C and 1D, from the four different optical images, are arranged in a 2×2 fashion in the upper left of optical image 170 (the inversion of image 170 is neglected for clarity). Regions 1-9 are similarly arranged. Thus, the regions 1A-9A that make up optical image 170A are spread out across the composite optical image 170, separated by portions of the other optical images 170B-D. Put in another way, if the sensor is a rectangular array of individual sensor elements, the overall array can be divided into rectangular subarrays 171(1)-(9) of sensor elements (only one subarray 171(1) is shown in FIG. 1B). For each region 1-9, all of the corresponding regions from each filtered image are imaged onto the subarray. For example, regions 1A, 1B, 1C and 1D are all imaged onto subarray 171(1). Note that since the filter module 125 and sensor array 180 are located in conjugate planes, each imaging element 115 in array 114 forms an image of the filter module 125 at the sensor plane SP. Since there are multiple imaging elements 115, multiple images 171 of the filter module 125 are formed.

The multiplexed image 170 can be processed by processing module 190 to reconstruct desired images of the object. The processing could be deinterleaving and demultiplexing. It could also include more sophisticated image processing. In this example, the desired images are color images of the object 150 (e.g., RGB color images or XYZ color images). In one implementation, the color filter module 125 is designed so that the filters 127 have spectral responses matched to the different color components.

It should be noted that FIG. 1 has been simplified to illustrate underlying concepts. For example, the object 150 was artificially divided into an array in order to more easily explain the overall imaging function. The invention is not limited to arrayed objects. As another example, most practical systems will use significantly larger arrays, particularly at the sensor array and possibly also at the filter module. In addition, there need not be a 1:1 relationship between the 6×6 regions at the sensor plane and the underlying sensor elements in the sensor array. Each region could correspond to multiple sensor elements, for example. As a final example, the regions labeled 1 in the object, 1A in the filtered image 155A and 1A in the composite image 170 do not have to be exact images of each other. In some designs, region 1A within image 170 may capture the filtered energy approximately from region 1 in the object 150, but it may not actually be an image of region 1. Thus, the energy collected by sensor elements in region 1A of image 170 may be integrating and sampling the image (or some transformation of the image) in region 1 in object 150, rather than representing a geometrical reproduction of the object at that region. In addition, effects such as parallax, vignetting, diffraction and optical propagation may affect any image formation.

The approach shown in FIG. 1 has several advantages. First, multiple optical images 170A-D are captured simultaneously at the sensor plane. Second, each captured image is filtered by a filter 127A-D within the color filter module 125, and each filter 127 may be designed to implement different filtering functions. For convenience, the light distribution incident on the sensor array 180 will be referred to as a color plenoptic image 170, and the effect of the color filter module may be referred to as spectral-coding. Hence, the system 110 is referred to as a spectrally-coded plenoptic imaging system. Furthermore, since the color filter module 125 is located at a conjugate plane SP' rather than the actual sensor plane SP, and since this typically means that the color filter module will be much larger compared to what would be required at the sensor plane, the tolerances and other mechanical requirements on the color filter module are relaxed. This makes it easier to manipulate the color filter module, compared to if the color filter module were located at the sensor plane (e.g., if attached to the sensor assembly).

Figure 2:
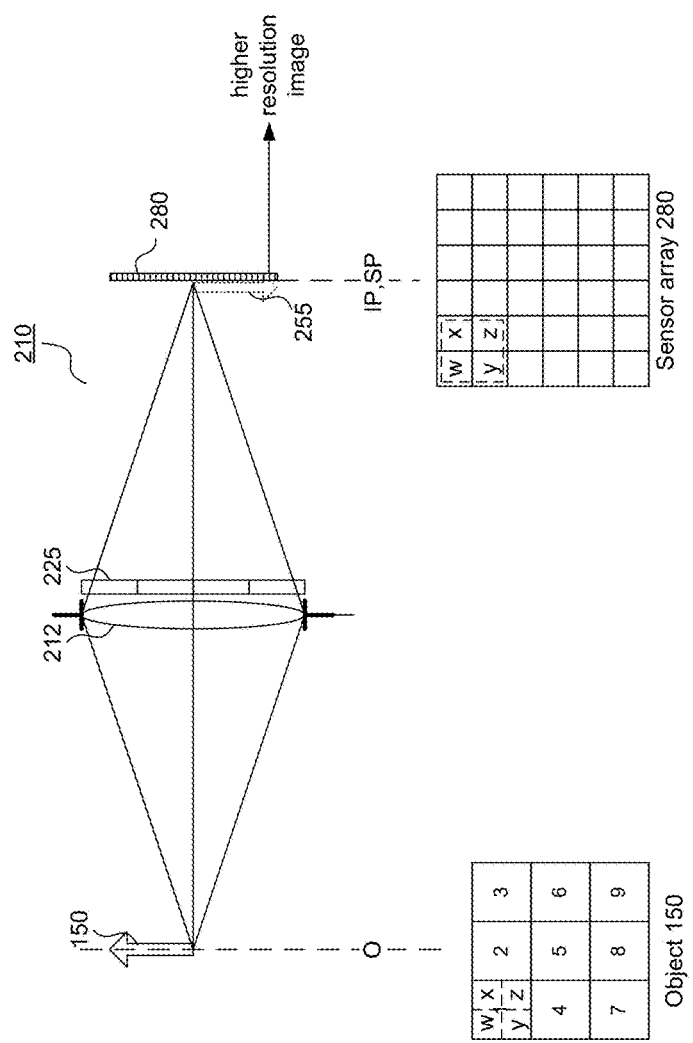
FIG. 2 is a diagram illustrating a higher resolution grayscale imaging system.

FIG. 2 is a diagram illustrating an example of a conventional imaging system. For now, ignore the color filter module 225. The imaging system 210 includes primary imaging optics 212 (represented by a single lens in FIG. 2) and a sensor array 280. For convenience, the imaging optics 212 is depicted in FIG. 2 as a single objective lens, but it should be understood that it could contain multiple elements. The objective lens 212 forms an optical image 255 of the object 150 at an image plane IP. The sensor array 280 is located at the image plane IP and captures the optical image 255. Note that in FIG. 2, the sensor plane SP and image plane IP are the same, whereas they are different in FIG. 1.

The bottom portion of FIG. 2 is provided to facilitate comparison to the spectrally-coded plenoptic imaging system of FIG. 1. As in FIG. 1, the object 150 is divided into a 3×3 array of regions which are labeled 1-9, and the sensor array 280 is shown as a 6×6 rectangular array. The imaging system 210 forms an optical image 255 of the object 150 at the sensor plane SP. Region 1 of the object is imaged onto the four sensors denoted by the dashed square. More specifically, region 1 of the object is subdivided into subregions w, x, y, z, each of which is imaged onto the corresponding sensor, also denoted by w, x, y, z.

Now consider the effect of color filter module 225. Due to its location, the color filter module 225 does not result in the creation of separate color images, as was the case with the spectrally-coded plenoptic imaging system 110. Rather, it provides an overall spectral filtering to the optical image 255. For example, if the color filter module 225 contained R, G and B color filters, then light traveling through the R filter will be filtered by the R filter, light traveling through the G filter will be filtered by the G filter, and light traveling through the B filter will be filtered by the B filter. However, unlike in the plenoptic imaging system 110, each sensor receives light traveling through all of the filters, so there will not be separate R, G and B images. For this system, it is usually preferable to not use a color filter module 225. However, in the combined systems described below, the color filter module 225 may be used for plenoptic imaging and then remain in place for the higher resolution imaging. In these cases, it may be advantageous to include clear filters in the color filter module 225 in order to increase the overall light throughput.

Everything else being equal, the conventional image 255 captured by the imaging system of FIG. 2 has a higher resolution than the color plenoptic image 155 captured by the spectrally-coded plenoptic imaging system of FIG. 1. In both FIGS. 1 and 2, the sensor array 180,280 is 6×6. However, the conventional imaging system captures a 6×6 grayscale image, whereas the spectrally-coded plenoptic imaging system captures four color images, but each color image is only 3×3. One advantage of plenoptic cameras is that they can capture different color images simultaneously. However, one disadvantage is that this usually comes at the expense of lower resolution.

Figure 3:
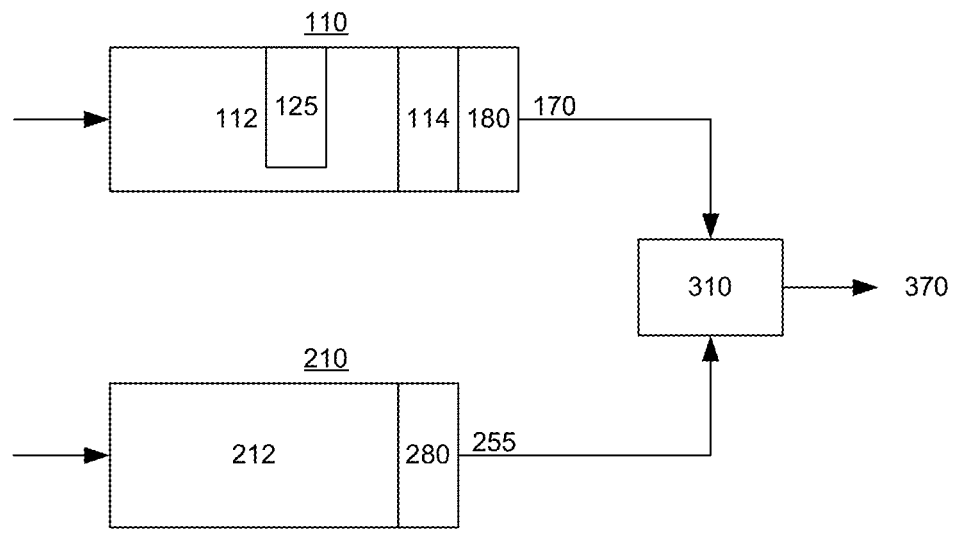
FIG. 3 is a block diagram of a dual-mode system that combines a spectrally-coded plenoptic imaging system with a higher resolution imaging system, according to the invention.
Figure 4:
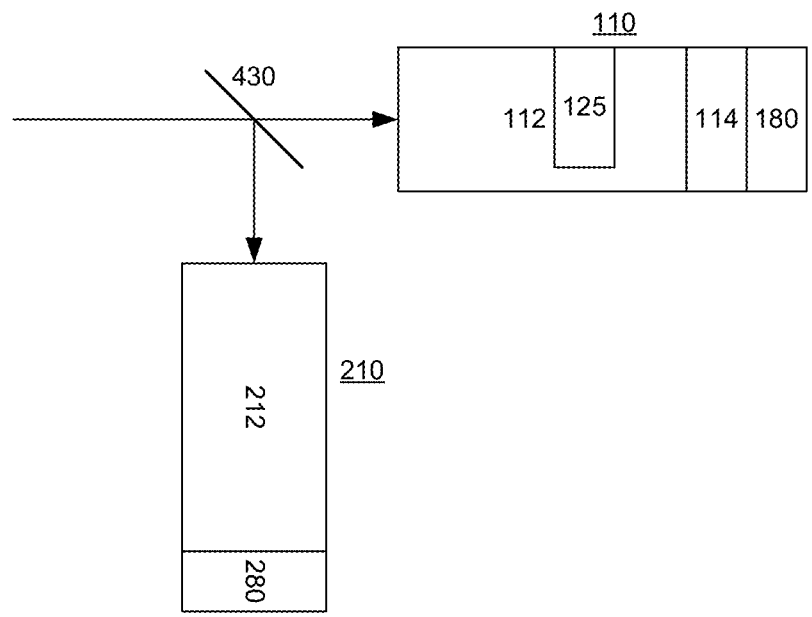
FIG. 4 is a block diagram of a dual-mode system using separate cameras.

FIG. 3 is a block diagram of a dual-mode system that combines a spectrally-coded plenoptic imaging system 110 with a higher resolution imaging system 210. The color plenoptic image 170 captured by the plenoptic camera 110 is combined with the higher resolution grayscale image 255 captured by the conventional camera 210, to produce a color image 370 that has higher resolution than the original color plenoptic images. A processing module 310 combines the different images. The approach shown in FIG. 3 can be physically implemented in different ways. FIGS. 4-6 show some examples. For clarity, the processing module 310 is omitted from these figures.

FIG. 4 is a block diagram of a dual-mode system using separate imaging systems. The system in FIG. 4 includes a complete spectrally-coded plenoptic camera 110 and a separate, complete grayscale camera 210. The two cameras are optically aligned, for example by a beamsplitter 430. One advantage of this approach is that neither imaging system need be modified for use in this configuration. Rather, off-the-shelf cameras can be purchased and assembled into the system of FIG. 4. One disadvantage is that the system requires more components than other approaches.

Figure 5A:
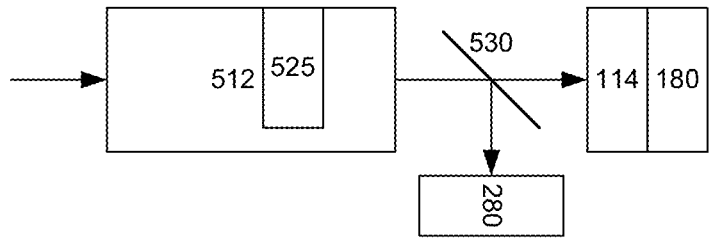
FIGS. 5A-5E are block diagrams of dual-mode systems using shared optics but separate sensor arrays.

FIGS. 5A-5E show examples where the plenoptic imaging system 110 and higher resolution imaging system 210 share a front aperture (and some or all of the imaging optics), but have separate sensor arrays. In FIG. 5A, the imaging optics for both imaging systems is shared. That is, a single set of imaging optics 512 operates as the imaging optics 112 for the spectrally-coded plenoptic imaging system 110 and also as the imaging optics 212 for the higher resolution imaging system 210. In this example, a beamsplitting device 530 splits the optical path downstream of the shared imaging optics 512. Part of the light travels to the plenoptic sensor module 114,180, and the other part travels to the sensor array 280. Different beamsplitting devices could be used: neutral density beamsplitter, beamsplitter with some wavelength dependence, polarization beamsplitter, etc.

Figure 6A:
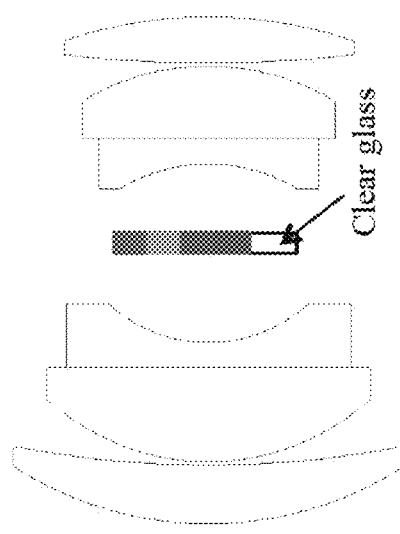
FIGS. 6A-6B illustrate use of a color filter module without clear filters.
Figure 6B:
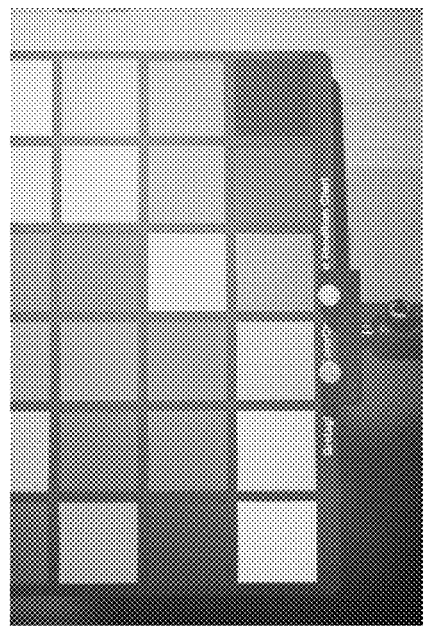
Figure 6C:
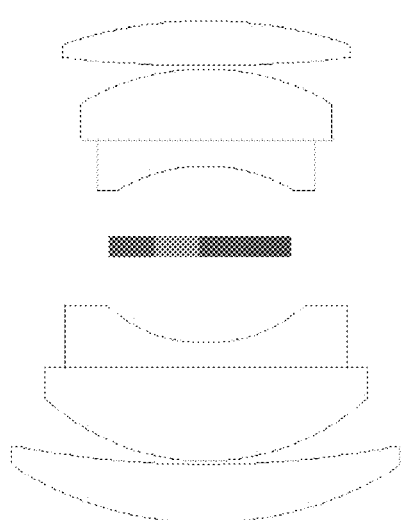
FIGS. 6C-6D illustrate use of a color filter module with clear filters.
Figure 6D:
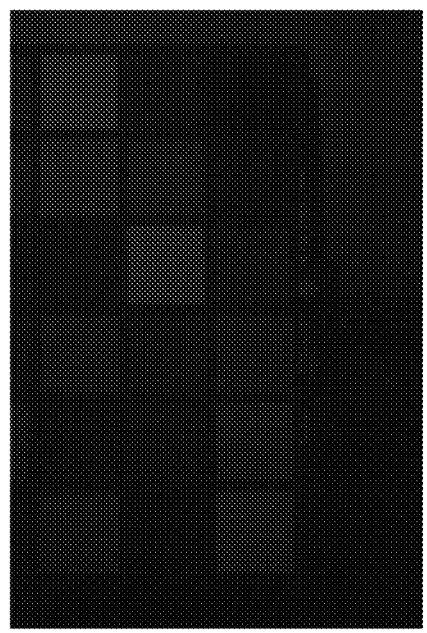

In FIG. 5A, the color filter module 525 is in the optical paths for both the plenoptic imaging system and for the higher resolution imaging system so it affects the light captured by both sensor arrays 180,280. In this case, it can be useful to use a color filter module with at least one clear filter to increase the amount of light captured by the higher resolution imaging system. The filter does not have to be perfectly clear, it could be a neutral density filter or a polarization filter, for example. FIG. 6A shows an example of imaging optics 512 and a color filter module 525 without a clear filter (i.e., all of the filters are color filters). FIG. 6B shows the corresponding grayscale image of a color test chart. FIG. 6C is the same as FIG. 6A, but with a color filter module 525 that has a clear filter. FIG. 6D shows the corresponding grayscale image, which is much brighter. This approach is especially useful if the color filters are narrowband color filters.

Figure 5B:
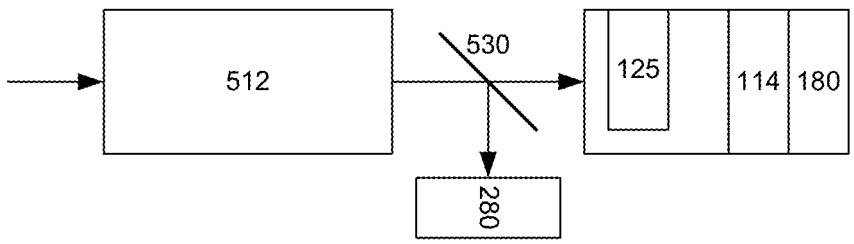
Figure 5C:
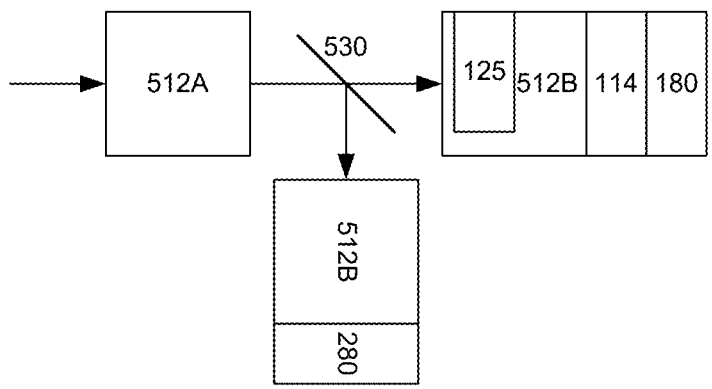

FIG. 5B shows a dual-mode system where the color filter module 125 is not in the optical path of both cameras. In this example, the beamsplitter 530 is downstream of the imaging optics 512, but the color filter module 125 is positioned downstream of the beamsplitter 530. For example, relay optics could be used to achieve this. FIG. 5C is another alternative where the beamsplitter 530 is located within the imaging optics 512, but upstream of the color filter module 125. In this figure, the imaging optics is divided into two halves 512A (which is upstream of the beamsplitter) and 512B (downstream of the beamsplitter). The downstream portion 512B is duplicated for each imaging system.

Figure 5D:
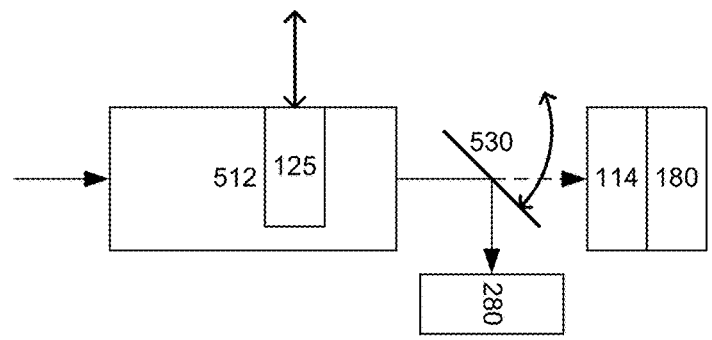

In FIG. 5D, the incoming light is directed alternately to the plenoptic sensor module 114,180 and to the sensor array 280. In this example, the time-multiplexing device is a flip mirror that is alternately moved into and out of the optical path. When the mirror is out of the optical path, then the light is directed to the plenoptic sensor module 114,180 and the system operates as a spectrally-coded plenoptic camera. When the mirror is in the optical path (shown in FIG. 5D), then the light is directed to the sensor array 280 and the system operates as a grayscale camera. Other types of time-multiplexing devices including rotating choppers and other types of moveable mirrors. In this approach, the color filter module 125 could also be moved in and out of the optical path: into the optical path for color plenoptic operation and out of the optical path for grayscale imaging operation.

Figure 5E:
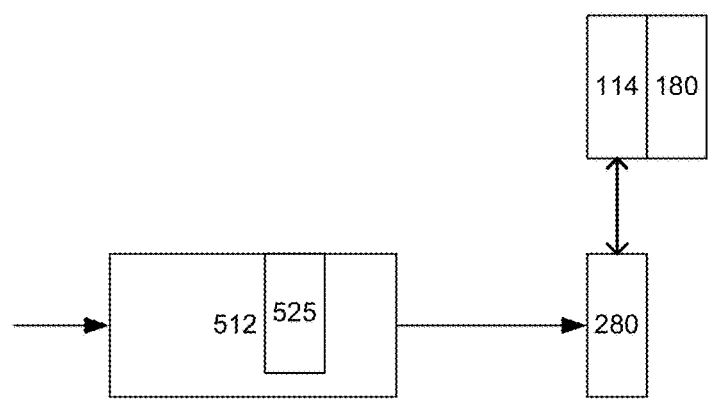

In FIG. 5E, a mechanical mechanism moves the two sensor arrays. When the plenoptic sensor module 114,180 is positioned in the optical path, the system operates as a spectrally-coded plenoptic camera. When the sensor array 280 is positioned in the optical path (as shown in FIG. 5E), the system operates as a grayscale camera.

Figure 7:
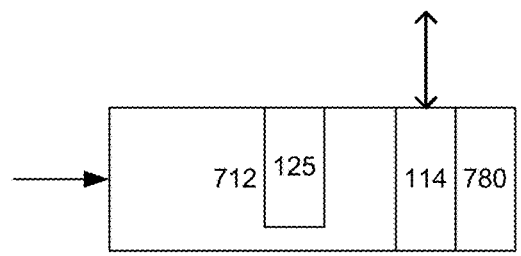
FIG. 7 is a block diagram of a dual-mode system using shared optics and a shared sensor array.

FIG. 7 is a block diagram of a dual-mode system using shared optics 712 and a shared sensor array 780. In this example, the secondary imaging array 114 is moved into and out of the system. Other components may also be moved. For example, when the secondary imaging array 114 is moved into place, the shared sensor array 780 may be moved back to maintain the correct spacing for a plenoptic configuration. Alternately, the shared imaging optics 712 may be adjusted to move the location of the image plane relative to the sensor array 780. The color filter module 125 may also be moved in and out of place. In one implementation, the movement of the microlens array 114 is achieved by using a flip mirror.

Figure 8A:
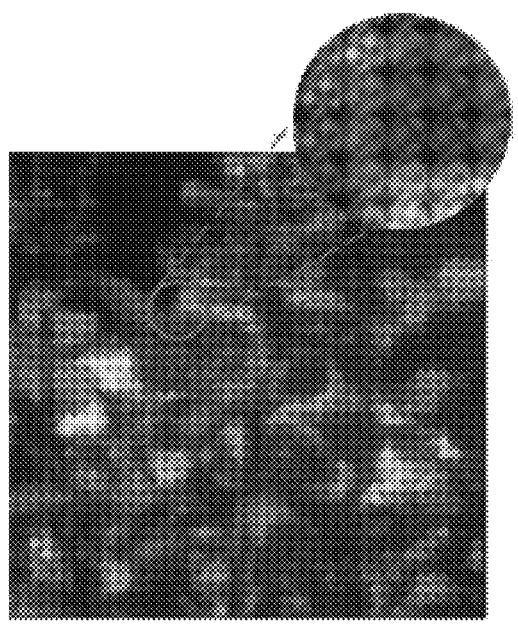
FIGS. 8A and 8B show a color plenoptic image and grayscale image, respectively, from a simulation of a dual-mode system.
Figure 8B:

FIGS. 8-10 illustrate simulated operation of a dual-mode system. A color plenoptic image was captured using a spectral coded plenoptic camera with narrowband spectral filters placed in the aperture of the primary lens. The spectral filters were centered at 650 nm, 540 nm and 460 nm. The raw plenoptic color image 170 captured by the spectrally-coded plenoptic camera is shown in FIG. 8A. This is before the raw data is processed and separated into separate color images. The higher resolution grayscale image captured by the grayscale camera is shown in FIG. 8B.

Figure 9C:
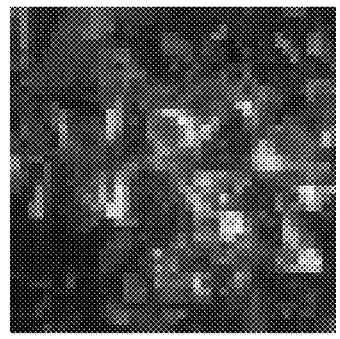
FIGS. 9A-9C show images of different color components reconstructed using standard plenoptic image reconstruction techniques.
Figure 9B:
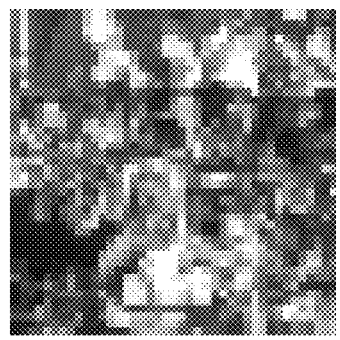
Figure 9A:
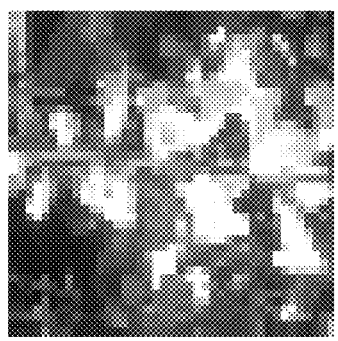

Based on the color plenoptic image of FIG. 8A, a set of low resolution spectral images was reconstructed at three different wavelengths, as shown in FIGS. 9A-9C. FIG. 9A is the image at 650 nm, FIG. 9B at 540 nm, and FIG. 9C at 460 nm. The resolution of the reconstructed images is 41×41, which is the number of microlenses in the plenoptic camera.

Figure 11:
FIG. 11 shows a full color image reconstructed according to the invention.
Figure 10C:
FIGS. 10A-10C show images of different color components reconstructed according to the invention.
Figure 10B:
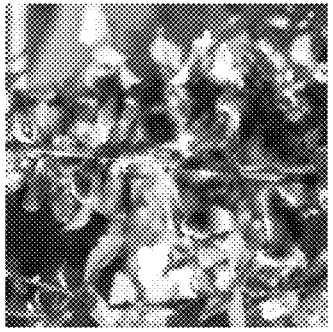
Figure 10A:
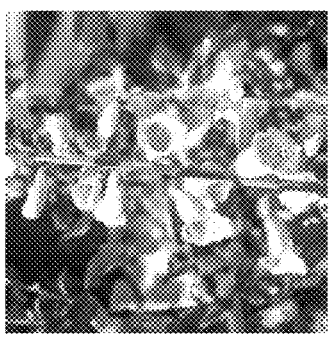

The resolution can then be enhanced based on image fusion techniques, combining the low resolution color components of FIG. 9 with the high resolution grayscale image of FIG. 8B. In this example, because the spectral filters are narrowband RGB filters, a simple approach which is commonly used in RGB color image processing is used. The reconstructed low resolution color components are first converted to the HSV color space. Histogram equalization is performed between the luminance of the converted HSV images and the higher resolution grayscale image. After histogram equalization, the luminance is replaced with the grayscale image and the HSV images are converted back to the RGB space. The reconstructed color components are shown in FIGS. 10A-10C. They have an enhanced resolution of 400×400. The increase in resolution is apparent. FIG. 11 shows the full color image reconstructed by combining the three high resolution color components of FIG. 10. The HSV approach is used merely as an example.

Other image fusion techniques are available. Examples include principal component analysis, wavelet decomposition, more advanced HSV models for multispectral images, high-pass modulation and the Brovey transform.

Although the detailed description contains many specifics, these should not be construed as limiting the scope of the invention but merely as illustrating different examples and aspects of the invention. It should be appreciated that the scope of the invention includes other embodiments not discussed in detail above. For example, the high resolution image could be captured by a color imaging system rather than a grayscale imaging system. If an RGB sensor is used, the high resolution image may be based on the luminance information.

The approach described above can also be applied to many different applications. An exemplary system is a plenoptic otoscope with viewfinder as the second sensor, where the streaming luminance or color image is also functioning as a preview for the medical professional to assess the position of the imaging system with respect to the object (e.g. the ear drum). In that system, the purpose is to preview the high-resolution image reconstruction. The characteristics of the two sensor arrays can be very different. One sensor array may have larger pixels to sense wavelength-filtered signals, and the other sensor array may have smaller pixels to sense the luminance or even a higher resolution color image. Examples of a penoptic otoscope are described in U.S. patent application Ser. No. 13/896,924, "Plenoptic Otoscope," which is incorporated by reference herein.

Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. An enhanced-resolution, plenoptic color imaging system comprising:
    a spectrally-coded plenoptic imaging system for capturing a color plenoptic image of an object, the spectrally-coded plenoptic imaging system comprising:
        first imaging optics that forms a first optical image of the object at an image plane of the first imaging optics, the first imaging optics having a pupil plane;
        a plenoptic sensor module having a secondary imaging array and a first sensor array; the secondary imaging array positioned at the image plane of the first imaging optics and the first sensor array positioned at a conjugate of the pupil plane; and
        a color filter module comprising a plurality of different color filters including RGB filters, the color filter module positioned at a conjugate to the first sensor array; and
    a higher resolution imaging system for capturing a conventional grayscale image of the object; wherein the higher resolution imaging system and the spectrally-coded plenoptic imaging system are optically aligned to capture images of the same object, and the captured conventional grayscale image has a higher resolution than the captured color plenoptic image; and
    a processing module that combines the captured higher resolution image and the captured color plenoptic image into a color image of the object based on a luminance component of the captured higher resolution image and on a luminance component of the captured color plenoptic image, said color image having a higher resolution than the captured color plenoptic image; wherein the processing module converts RGB color components of the captured color plenoptic image to an HSV color space, performs histogram equalization between a luminance of the captured color plenoptic image converted to the HSV color space and the grayscale image, replaces the histogram-equalized luminance of the captured color plenoptic image converted to the HSV color space with the grayscale image, and converts from the HSV color space back to an RGB color space.

2. The enhanced-resolution, plenoptic color imaging system of claim 1 wherein:
    the higher resolution imaging system and the spectrally-coded plenoptic imaging system share a front aperture;
    the higher resolution imaging system comprises second imaging optics and a second sensor array, the second imaging optics forming a second optical image of the object and the second sensor array capturing said second optical image;
    wherein the first imaging optics and the second imaging optics share the front aperture;
        but the second sensor array and the plenoptic sensor module are implemented by different physical components.

3. The enhanced-resolution, plenoptic color imaging system of claim 2 wherein the first imaging optics and the second imaging optics are physically implemented by a shared imaging optics.

4. The enhanced-resolution, plenoptic color imaging system of claim 3 further comprising:
    a beamsplitting device positioned downstream of the shared imaging optics, the beamsplitting device splitting light from the shared imaging optics between the second sensor array and the plenoptic sensor module.

5. The enhanced-resolution, plenoptic color imaging system of claim 4 wherein the beamsplitting device is a neutral density beamsplitter.

6. The enhanced-resolution, plenoptic color imaging system of claim 4 wherein the beamsplitting device is a dichroic beamsplitter.

7. The enhanced-resolution, plenoptic color imaging system of claim 4 wherein the beamsplitting device is a polarization beamsplitter.

8. The enhanced-resolution, plenoptic color imaging system of claim 3 further comprising:
 a time-multiplexing device positioned downstream of the shared imaging optics, the time-multiplexing device directing light from the shared imaging optics alternately to the second sensor array and to the plenoptic sensor module.

9. The enhanced-resolution, plenoptic color imaging system of claim 8 wherein the time-multiplexing device is a chopper.

10. The enhanced-resolution, plenoptic color imaging system of claim 8 wherein the time-multiplexing device is a moveable mirror that can be moved to direct light from the shared imaging optics alternately to the second sensor array and to the plenoptic sensor module.

11. The enhanced-resolution, plenoptic color imaging system of claim 3 further comprising:
 a mechanical mechanism for alternately positioning the second sensor array and the plenoptic sensor module to receive light from the shared imaging optics.

12. The enhanced-resolution, plenoptic color imaging system of claim 1 wherein:
 the higher resolution imaging system comprises second imaging optics and a second sensor array, the second imaging optics forming a second optical image of the object and the second sensor array capturing said second optical image;
 wherein the first imaging optics and the second imaging optics are physically implemented by a shared imaging optics; and the first sensor array and the second sensor array are physically implemented by a shared sensor array.

13. The enhanced-resolution, plenoptic color imaging system of claim 12 further comprising:
 a mechanical mechanism for alternately positioning and removing the secondary imaging array from between the shared imaging optics and the shared sensor array;
  wherein the shared sensor array captures the spectrally-coded plenoptic image when the secondary imaging array is positioned between the shared imaging optics and the shared sensor array and the shared sensor array captures the optical image when the secondary imaging array is removed from between the shared imaging optics and the shared sensor array.

14. The enhanced-resolution, plenoptic color imaging system of claim 13 wherein the mechanical mechanism flips the secondary imaging array into and out of a position between the shared imaging optics and the shared sensor array.

\* \* \* \* \*